C. & J. G. ROWLAND.
Peg or Sole-Fastenings.
No. 6,298. Reissued Feb. 16, 1875.
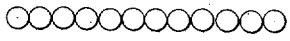
Fig 2.
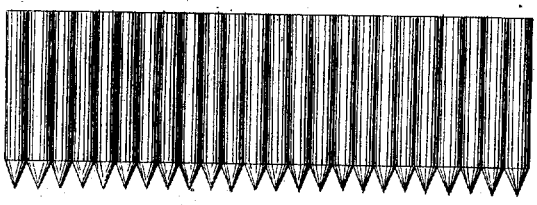
Fig 1.
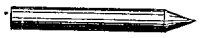
Fig 3.
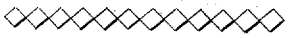
Fig 5.
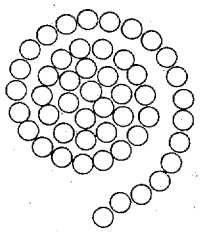
Fig 4.
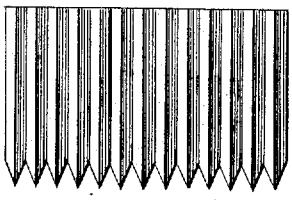
Witnesses:
A. Gardner.
Edw. W. Dorn
Inventor:
Benjamin F. Sturtevant
Assee of C. & J. G. Rowland
per Crosby & Gregory
Attys
THE GRAPHIC CO. PHOTO-LITH. 39 & 41 PARK PLACE, N.Y.

UNITED STATES PATENT OFFICE.

CHARLES ROWLAND AND JOSEPH G. ROWLAND, OF QUINCY, ILLINOIS, ASSIGNORS, BY MESNE ASSIGNMENTS, TO BENJAMIN F. STURTEVANT, OF BOSTON, MASSACHUSETTS.

IMPROVEMENT IN PEGS OR SOLE-FASTENINGS.

Specification forming part of Letters Patent No. 68,005, dated August 20, 1867; reissue No. 6,298, dated February 16, 1875; application filed February 10, 1875.

*To all whom it may concern:*

Be it known that CHARLES ROWLAND and JOSEPH G. ROWLAND, of Quincy, in the county of Adams and State of Illinois, invented certain new and useful Improvements in Shoe-Pegs; and it is hereby declared that the following is a full, clear, and exact description thereof, reference being had to the accompanying drawings making part of this specification, and to the letters of reference marked thereon, like letters indicating like parts wherever they occur.

To enable others skilled in the art to construct and use the said invention, it is described as follows:

This invention consists in a strip of sole-fastenings, held together at their sides or edges by thin films of the material that forms the substance of the fastenings.

Figure 1 represents a single peg. Figs. 2, 3, and 4 represent a series of them connected in the form of a strip. Fig. 5 represents a series of the pegs formed into a coil or roll for use.

A strip of leather of suitable size and thickness is taken and compressed between dies of any suitable style, in such manner as to form it into pegs of the required size and form, connected together at the sides by thin films of the substance of the pegs. These dies may consist of flat blocks, with proper shaped recesses cut in their faces, or the dies may be formed on the surface of the rolls, and the strips be compressed and cut or formed into pegs by being passed between them, this latter being the preferable method.

With a strip formed as described, the individual pegs composing the strip may be easily separated from the strip when it is desired to use them.

Having thus described the invention, what is claimed is—

A strip of sole-fastenings united together by thin films of the substance forming the substance of the fastenings, substantially as described.

BENJ. F. STURTEVANT.

Witnesses:

G. W. GREGORY,

E. C. WEAVER.